(12) United States Patent
Larsson

(10) Patent No.: US 6,343,633 B1
(45) Date of Patent: Feb. 5, 2002

(54) TREE HARVESTER

(75) Inventor: Lars Larsson, Dala-Järna (SE)

(73) Assignee: Elmek Automation AB, Dala-Jarna (SE)

(*) Notice: Subject to any disclaimer, the term of this patent is extended or adjusted under 35 U.S.C. 154(b) by 0 days.

(21) Appl. No.: 09/555,132

(22) PCT Filed: Jun. 3, 1998

(86) PCT No.: PCT/SE98/01055

§ 371 Date: May 25, 2000

§ 102(e) Date: May 25, 2000

(87) PCT Pub. No.: WO98/54950

PCT Pub. Date: Dec. 10, 1998

(30) Foreign Application Priority Data

Jun. 4, 1997 (SE) .............................................. 9702125

(51) Int. Cl.$^7$ .............................................. A01G 23/09
(52) U.S. Cl. .................. 144/34.5; 144/4.1; 144/339
(58) Field of Search ................................. 269/287, 288; 144/4.1, 34.1, 34.5, 339; 83/928

(56) References Cited

U.S. PATENT DOCUMENTS

| | | | |
|---|---|---|---|
| 3,421,558 A | * 1/1969 | Thompson ................. 144/34.5 |
| 3,667,515 A | * 6/1972 | Corey ........................ 144/34.5 |
| 4,108,224 A | * 8/1978 | Wirt ........................... 144/34.5 |
| 4,313,479 A | * 2/1982 | Coughron, Jr. ............ 144/34.5 |
| 5,377,730 A | 1/1995 | Hamilton ..................... 144/4.1 |
| 5,595,225 A | 1/1997 | Gilbert et al. ............. 144/34.1 |

FOREIGN PATENT DOCUMENTS

| EP | 0 041 901 | 12/1981 |
|---|---|---|
| JP | 8-152321 | 6/1996 |

* cited by examiner

*Primary Examiner*—W Donald Bray
(74) *Attorney, Agent, or Firm*—Young & Thompson

(57) ABSTRACT

A tree harvester, arranged on the movable arm of a forestry vehicle includes a cutting tool having pivotable claws with releaseable locking elements for relative, mechanical locking of the claws in an inwardly pivoted position, and a longitudinally adjustable arm, interconnected between the gripping claws of the cutting elements for simultaneous pivoting of the claws outwardly and inwardly, respectively. The arm is adapted to admit, on desire, the first claw independently to be pivoted relative to the second claw, wherein the outside of the first claw includes teeth adapted for engagement with a stud, arranged in the point end of the second claw, the geometry of the claws and the length of the interconnected arm are chosen such that the point end of the first claw moves inwardly of the point end of the second claw in the simultaneous pivoting motion.

4 Claims, 2 Drawing Sheets

TREE HARVESTER

CROSS REFERENCE TO RELATED APPLICATION

This is the 35 USC national stage of International application PCT/SE98/01055 filed on Jun. 3, 1998, which designated the United States of America.

FIELD OF THE INVENTION

The invention relates to a tree harvester comprising means for cutting, leveling means and means for rotating the tree harvester.

SUMMARY OF THE INVENTION

The object of the invention is to provide a tree harvester which increases the operational ability in wood clearing, intermediate cutting and harvesting of energy forests, and which enhances the tool effectiveness and operating economy.

This object is met by providing a cutting means for tree cutting; by providing a means for rapidly detecting and adjusting the angle of inclination with respect to the ground on sloping ground surfaces; and by providing a means for rapid and accurate rotation and positioning of the tool in tree cutting operations.

BRIEF DESCRIPTION OF THE DRAWINGS

The invention is disclosed in detail below, reference being made to the accompanying drawings wherein FIG. 1 diagrammatically shows the inventive cutting means in an elevational view from above.

DETAILED DESCRIPTION OF THE INVENTION

Figure 1:
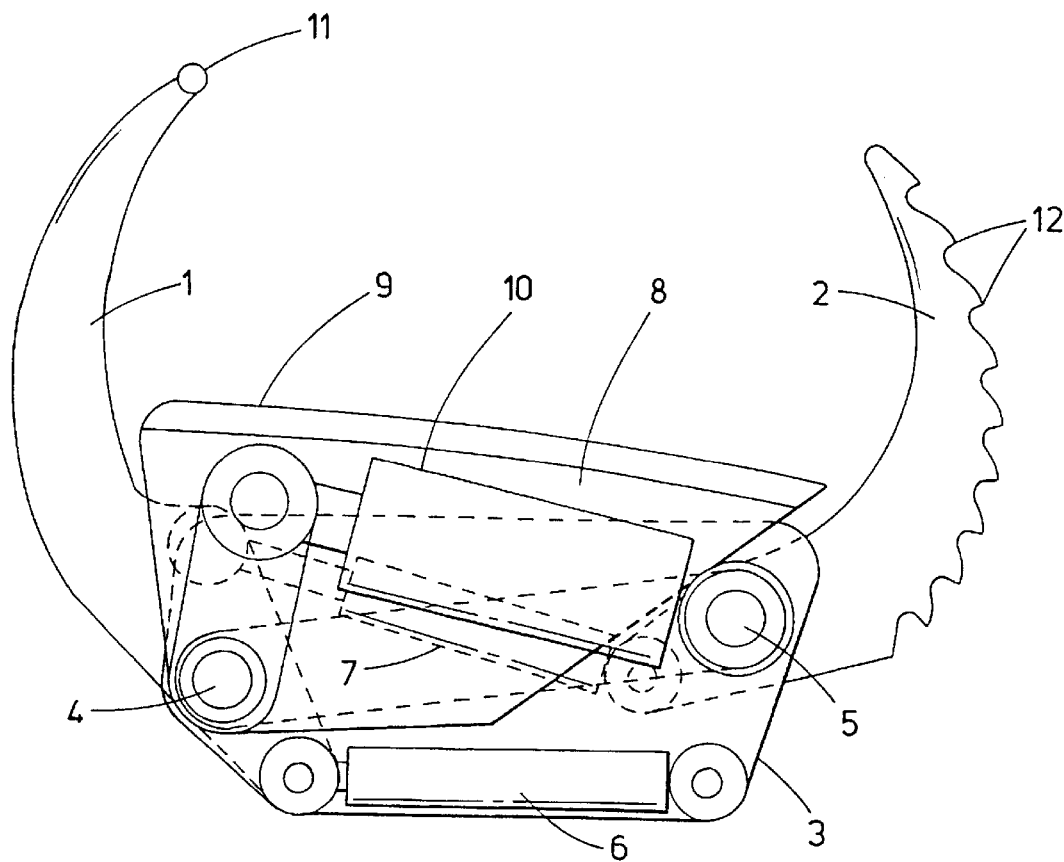
Figure 2:
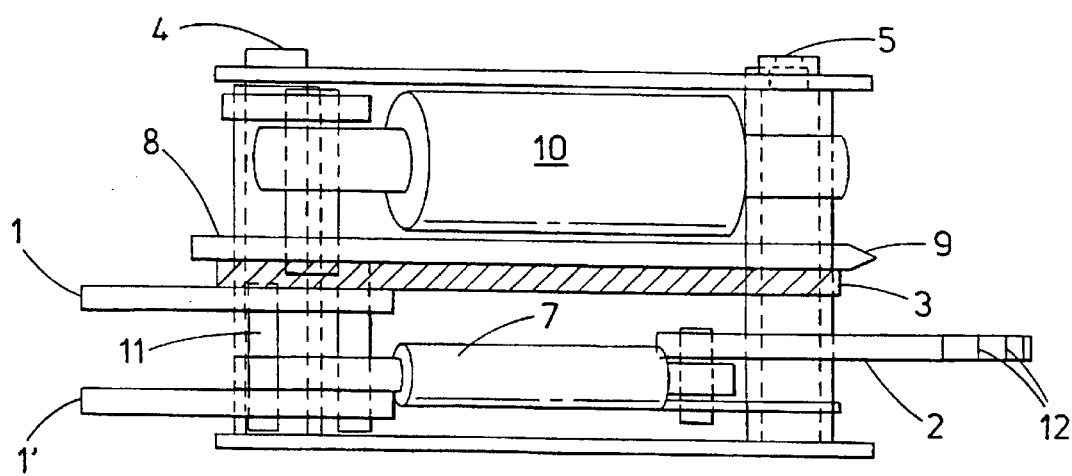
FIG. 2 shows the cutting means of FIG. 1 in an elevational side view, wherein some details are omitted for visual clearity.

The cutting means of FIGS. 1 and 2 comprises a pair of gripping claws 1 and 2, resp., pivotally attached to a frame 3. The claw 1 includes two identical claw halves 1 and 1' (see also FIG. 2), extended in parallel one above the other. The geometry and arcuate shape of the claws is chosen to permit the end point of claw 2 to move inwardly of the end point of claw 1,1' upon rotation around the pivots 4 and 5, resp., when the claws 1,1' and 2 are rotated inwardly towards a tool centre. The claw 1,1' is activated by a cylinder means 6 (for visual clarity, the cylinder 6 is omitted from the drawing of FIG. 2), operating between the frame 3 and claw 1,1'. A longitudinally adjustable, motion transmitting arm 7 is interposed between claws 1,1' and 2. Said arm may preferably be a cylinder means 7, contemplated for simultaneous and co-ordinated pivoting of the claws 1,1' and 2.

A knife 8 having a cutting edge 9 is pivotally arranged in the frame 3, said knife being journalled on the claw 1,1' pivot 4. A cylinder means 10 is arranged to operate between the frame 3 and the knife 8. The cylinder 10 may be dimensioned to have a capacity for forcing the knife 8 also through tree trunks of such dimensions, which often is considered to constitute the upper limit of what is referred to by the expression energy forests.

In the disclosed harvester, tree trunks of lesser diameter is pressed by the claws 1,1' and 2 against the knife edge for cutting. When cutting tree trunks of wider dimension, the cylinder 10 is operated to force the knife through the wood. In the later operation, the claws 1,1' and 2 provide a counter force in a way that is described below.

At the point end of claw 1,1', a fixedly attached stud 11 extends transversally to the claw. The stud 11 interacts with teeth 12, arranged on the outside of claw 2. The geometry of the claws and the length of the interconnecting arm 7 are chosen such, that the point end of claw 2 is moved inwardly of the stud 11 upon the simultaneous pivoting motion of the claws towards the tool centre, said motion being produced by the cylinder 6. When the claws 1,1' and 2 are operated to produce a counteracting force for the knife 8, the cylinder 7 is operated to retract, being extended in a resting position. As a result of retraction of cylinder 7, claw 2 is re-rotated outwardly from the tool centre until one of its teeth 12 engages the stud 11 and provides a mechanical locking of the claws 1,1' and 2 in a holding position. This mechanical lock prevents an outward rotation and opening of the claws when subjected to the pressing force produced by the cylinder 10 and knife 8 upon cutting of trees of wider dimensions. Opening of the claws and releasing the interlocking engagement is performed by extending the cylinder 7, whereby the claw 2 is pivoted inwardly towards the tool centre and the stud 11 is released from engagement with the tooth 12, whereupon the claws 1,1' and 2 are simultaneously rotated outwards by the cylinder 6. Once again, the stud 11 passes outside of the teeth 12 and the point end of claw 2 moves inwardly of the point end of claw 1,1'.

The relative locking engagement of the claws of the cutting tool in an inwardly pivoted position eliminates the need for heavy duty cylinder means to withstand the force of cylinder 10 and the knife 8. This way, the power of the knife may still be utilised while maintaining comparatively rapid working gripping claws, enhancing the operative speed and capacity of a tree harvester. The cutting means is operated hydraulically and has pressure sensing means for automatically running a pre-stored operation, wherein the locking cylinder 7 and knife cylinder 10 are activated as the result of a detected, pre-set work pressure of claw cylinder 6. The operator merely has to guide the tree harvester tool close to the tree trunk, and may activate the pre-stored work schedule by a single maneuver, e.g. pressing a button on the control panel.

The above cutting tool is incorporated in a tree harvester which is supported on a movable arm of a forestry vehicle. In order to enhance tree cutting on sloping ground surfaces, conventional tree harvesters are often pivotally supported on the arm and hydraulically controllable. When also on heavily slopping grounds, the trees grow vertically to a horizontal plane, it is desired to control and rotate the harvester around two axis, preferably around two transversally related axis lying in the same plane, e.g. the pivots of a universal joint. The inventive tree harvester comprises a levelling means which detects the inclination of the ground surface and controls drive means, e.g. hydraulic cylinders, to adjust and align the harvester tool relative to the horizontal plane.

Figure 3:
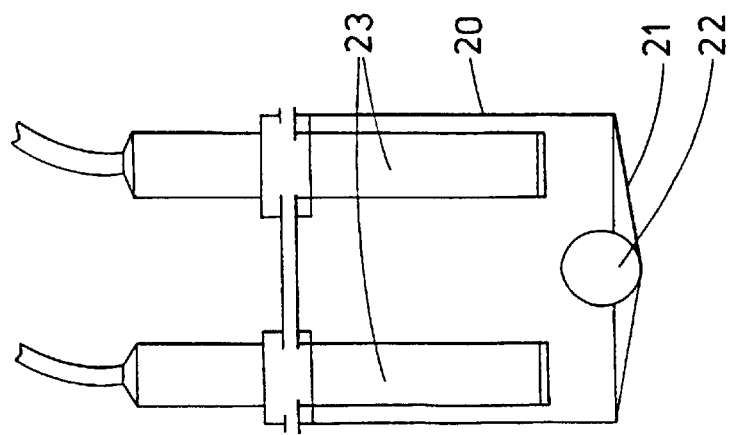
FIG. 3 diagrammatically shows the means for detecting the inclination of ground surface, and FIG. 4 diagrammatically shows the means for rotating the tool.

Reference being made to FIG. 3, the levelling means of the invention is diagrammatically shown in a cross sectional view.

A cylinder-shaped house 20 comprises a slightly conical bottom surface 21, having a slope angle of appr. 5 degrees relative to a horizontal plane. A magnetizable ball 22 rests on the bottom 21. Inductive sensors 23 are peripherally arranged in a cover of the house 20. Said sensors detect any displacement of the ball relative to the resting position at the centre of the conical bottom. The number of sensors 23 is chosen to admit the detection of ball displacements in any radial direction from the centre. The output signals of the sensors control the operation of the cylinders to pivot the harvester tool around the transverse axis until the ball is returned to the cone centre, whereby the tool is aligned relative to the horizontal plane.

Alternatively, the levelling means is used for pivoting the tool around a first transverse axis, whereas the tool is manually pivoted around a second axis by the operating personnel. Said second axis may in this case be a pivotable attachment of the movable arm and extended in a plane which is parallel to said first axis. In the alternative embodiment, the bottom surface of the levelling means is slightly V-shaped and only two inductive sensors are mounted, while the ball in this embodiment is movable along a straight line when displaced to and from the rest position.

Figure 4:
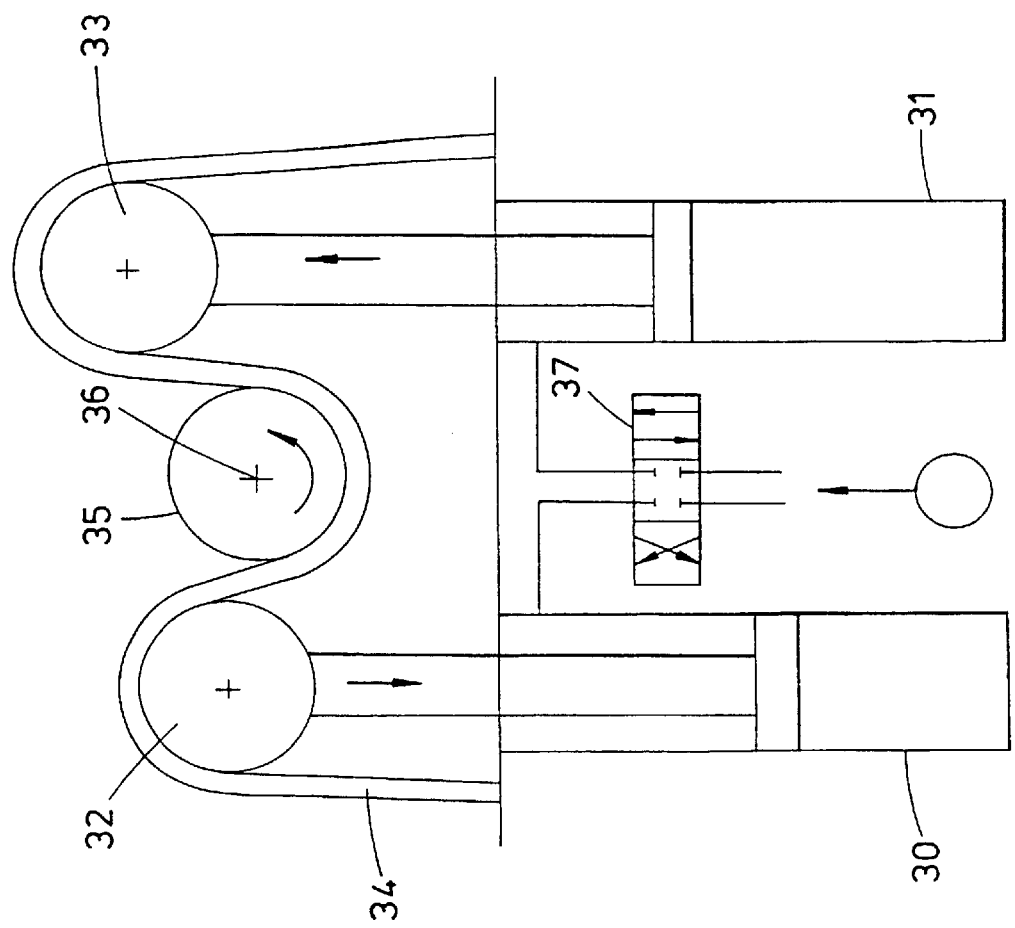

The harvester tool is rotatable in a horizontal plane, to facilitate the harvesting procedure. A rotational means of the inventive harvester is diagrammatically shown with reference to FIG. 4.

Two double acting, hydraulical cylinders 30 and 31, damped in the resp. extreme end positions, are arranged on a frame of the harvester tool. Cutting means and other functional tools of the harvester are supported on the frame, said tools and cutting means being pivotable around a vertical axis extending in a longitudinal direction of the harvester. Chain sprocket wheels 32, 33 are arranged in the cylinder piston ends, resp. Said sprocket wheels 32, 33 are rotatable around axis which extend in parallel to the vertical axis of the harvester. Both ends of a chain 34 are fixedly attached to the frame, the chain being guided on the sprocket wheels 32, 33. Chain 34 runs in an S-shaped path over a third sprocket wheel 35, rotatable around an axis 36. Said axis 36 may be coincident with the vertical axis of the harvester, or may be displaced and extended in parallel to the vertical axis by additional constructive means for transmitting movements to the sprocket wheel 35. The cylinders 30, 31 are continuously pressurized and connected to a common valve 37 for coordinated work strokes and return strokes. The strokes of the cylinders bring the chain to travel over the sprocket wheels 32, 33, thus causing the sprocket wheel 35 to rotate around the axis 36 in a rotation which is free from play and admits a smooth and accurate rotation of the harvester in relation to the movable arm and to the longitudinal direction of the vehicle.

The inventive tree harvester may if desired be used in combination with different tools attached to the harvester frame, such as means disclosed above may also be used seperately, even if the desired operative effect is achieved if said tools are used in combination.

The cutting tool according to the invention will increase the capacity of the harvester by admitting tree trunks of wider dimensions to be cut also when avoiding heavy and less rapid cylinder means, that typically will decrease the speed of work in previous tree harvester cutting tools. Accordingly, the inventive cutting tool may be contemplated to increase the available quantity of energy forest to be managed while maintaining operating economy.

The vertical and horizontal adjustments of the tree harvester, utilizing the levelleing and rotating means of the invention, will facilitate operation on broken ground, and operation tests have indicated that an experienced operator may process up to appr. 400 trees per hour, working the inventive tree harvester.

What is claimed is:

1. A tree harvester arranged on a movable arm of a forestry vehicle, comprising:

a cutting tool mounted on a gripper adapted for holding trees to be cut;

said gripper having pivotally supported and bow-shaped claws;

said claws being pivotally supported in a frame for coordinated and simultaneous pivoting motion through the action of a cylinder-unit acting between the frame and the claws;

said gripper including a longitudinally adjustable arm interconnecting the claws and controlled for relative pivoting motion of the claws; and said claws including means for mechanical interlock between the claws in at least one pivotal position, whereby the length of the adjustable arm is controlled to interlock and release, respectively, the claws from the interlocked pivotal position.

2. The tree harvester according to claim 1, wherein a stud is arranged in an outer end of one of said claws, and at least one tooth is arranged on a peripheral side of another claw; the stud being formed to engage said at least one tooth in at least one pivotal position of the claws and the length of the interconnecting adjustable arm being adjustable such that the stud of one of said claws passes said at least one tooth of the other claw in the simultaneous pivoting motion of the claws, and is brought into engagement and released from engagement, respectively, with the tooth in a pivoted position of the claws by adjusting the length of the adjustable arm.

3. The tree harvester according to claim 2, wherein said other claw includes multiple teeth arranged on the outer periphery of said other claw for optional interlock with the stud in various relative positions of the claws.

4. The tree harvester according to claim 1, wherein the adjustable arm is a cylinder unit.

* * * * *